United States Patent
Luo et al.

(10) Patent No.: US 11,398,002 B2
(45) Date of Patent: Jul. 26, 2022

(54) SYSTEMS AND METHODS FOR DETERMINING AN ESTIMATED TIME OF ARRIVAL

(71) Applicant: BEIJING DIDI INFINITY TECHNOLOGY AND DEVELOPMENT CO., LTD., Beijing (CN)

(72) Inventors: Qing Luo, Beijing (CN); Zheng Wang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 837 days.

(21) Appl. No.: 16/236,528

(22) Filed: Dec. 30, 2018

(65) Prior Publication Data
US 2019/0188818 A1  Jun. 20, 2019

Related U.S. Application Data

(63) Continuation of application No. PCT/CN2017/082163, filed on Apr. 27, 2017.

(51) Int. Cl.
| | | |
|---|---|---|
| G06Q 50/30 | (2012.01) | |
| G06Q 10/04 | (2012.01) | |
| H04W 4/029 | (2018.01) | |
| G06N 3/08 | (2006.01) | |

(52) U.S. Cl.
CPC ............ G06Q 50/30 (2013.01); G06N 3/08 (2013.01); G06Q 10/04 (2013.01); H04W 4/029 (2018.02)

(58) Field of Classification Search
CPC ....... G06Q 50/30; G06Q 10/04; H04W 4/029; G06N 3/08

USPC ........................................................ 705/13
See application file for complete search history.

(56) References Cited

U.S. PATENT DOCUMENTS

| | | | |
|---|---|---|---|
| 10,810,443 B2 * | 10/2020 | Crawford | ................ B60R 11/04 |
| 10,837,788 B1 * | 11/2020 | Kentley-Klay | .... G01C 21/3623 |
| 2009/0030885 A1 | 1/2009 | Depasquale et al. | |
| 2013/0024249 A1 * | 1/2013 | Zohar | .................... G07B 15/02 |
| | | | 705/13 |
| 2013/0158866 A1 | 6/2013 | Weir et al. | |

(Continued)

FOREIGN PATENT DOCUMENTS

| | | |
|---|---|---|
| CN | 102081859 A | 6/2011 |
| CN | 102436598 A | 5/2012 |

(Continued)

OTHER PUBLICATIONS

"Visual Geo-Localization and Location-Aware Image Understanding" by Zamir published in 2013 (Year: 2013).*
Zamir "Visual Geo-localization and Location Aware Image Understanding" (Year: 2013).*
Notice of Reasons for Rejection in Japanese Application No. 2018-568378 dated Jul. 7, 2020, 9 pages.
(Continued)

*Primary Examiner* — Zeina Elchanti
(74) *Attorney, Agent, or Firm* — Metis IP LLC

(57) ABSTRACT

A method for determining an estimated time of arrival (ETA) may include obtaining a service request from a terminal and determining a reference image relating to the service request. The method may also include obtaining a trained neural network model. The method may further include determining an ETA relating to the service request based on the reference image and the trained neural network model, and transmitting the ETA to the terminal.

20 Claims, 8 Drawing Sheets

(56) References Cited

U.S. PATENT DOCUMENTS

| | | | |
|---|---|---|---|
| 2013/0162792 A1* | 6/2013 | Lee | G06K 9/00362 348/77 |
| 2014/0039784 A1* | 2/2014 | Millspaugh | G08G 1/202 701/300 |
| 2014/0058652 A1 | 2/2014 | Duan et al. | |
| 2014/0180576 A1 | 6/2014 | Lamarca et al. | |
| 2016/0189048 A1 | 6/2016 | Chang et al. | |
| 2016/0189541 A1 | 6/2016 | Basir | |
| 2016/0202074 A1 | 7/2016 | Woodard et al. | |
| 2016/0378303 A1* | 12/2016 | Crilley | G06T 13/80 715/733 |
| 2017/0153714 A1* | 6/2017 | Gao | G06K 9/00798 |
| 2018/0096445 A1* | 4/2018 | Eyler | G06Q 10/02 |
| 2018/0191863 A1* | 7/2018 | Matthiesen | H04L 67/327 |
| 2018/0197071 A1* | 7/2018 | Dong | G06Q 30/0202 |
| 2019/0316926 A1* | 10/2019 | Wang | G01C 21/3438 |
| 2020/0003576 A1 | 1/2020 | Chen et al. | |
| 2021/0279131 A1* | 9/2021 | Smolyansky | G06F 11/1068 |
| 2021/0326783 A1* | 10/2021 | Kim | G06Q 50/10 |
| 2021/0342600 A1* | 11/2021 | Westmacott | G06K 9/00791 |

FOREIGN PATENT DOCUMENTS

| | | |
|---|---|---|
| CN | 104217605 A | 12/2014 |
| CN | 104575072 A | 4/2015 |
| CN | 104900063 A | 9/2015 |
| CN | 106022541 A | 10/2016 |
| CN | 106156531 A | 11/2016 |
| CN | 106205126 A | 12/2016 |
| CN | 106355921 A | 1/2017 |
| CN | 106384507 A | 2/2017 |
| JP | H05334276 A | 12/1993 |
| JP | 2007311854 A | 11/2007 |
| JP | 2016212535 A | 12/2016 |
| TW | 201608490 A | 3/2016 |
| WO | 2013166806 A1 | 11/2013 |

OTHER PUBLICATIONS

First Examination Report in Indian Application No. 201817049508 dated Aug. 10, 2020, 6 pages.
Choudhary Rubina et al., Real time prediction of bus arrival time: A review, 2016 2nd International Conference on Next Generation Computing Technologies (NGCT), Oct. 14, 2016, pp. 25-29, XP033076283.
International Search Report in PCT/CN2017/082163 dated Dec. 13, 2017, 4 pages.
Written Opinion in PCT/CN2017/082163 dated Dec. 13, 2017, 4 pages.
Supplementary Search of Extended European Search Report in European Application No. 17907281.4 dated Feb. 25, 2019, 2 pages.
First Office Action in Chinese Application No. 201780039826.0 dated Apr. 10, 2020, 24 pages.
Yin, Tingting et al., A Prediction Model of Bus Arrival Time at Stops with Multi-routes, World Conference on Transportation Research—WCTR 2016 Shanghai, 25: 4623-4636, 2017.
Lin, Yongjie et al., Real-Time Bus Arrival Time Prediction: Case Study for Jinan, China, Journal of Transportation Engineering, 139(11): 1133-1140, 2013.
Daehan Kwak et al., Seeing Is Believing: Sharing Real-time Visual Traffic Information via Vehicular Clouds, IEEE Access, 4: 1-14, 2016.
Johar Amita et al., Prediction of Bus Travel Time Using Artificial Neural Network, International Journal for Traffic and Transport Engineering, 5(4): 410-424, 2015.
Zegeye Kebede Gurmu et al., Artificial Neural Network Travel Time Prediction Model for Buses Using Only GPS Data, Journal of Public Transportation, 17(2): 45-65, 2014.
First Examination Report in Australian Application No. 2020239623 dated Jun. 16, 2021, 11 pages.
Decision to Grant a Patent in Japanese Application No. 2018-568378 dated Mar. 30, 2021, 5 pages.

* cited by examiner

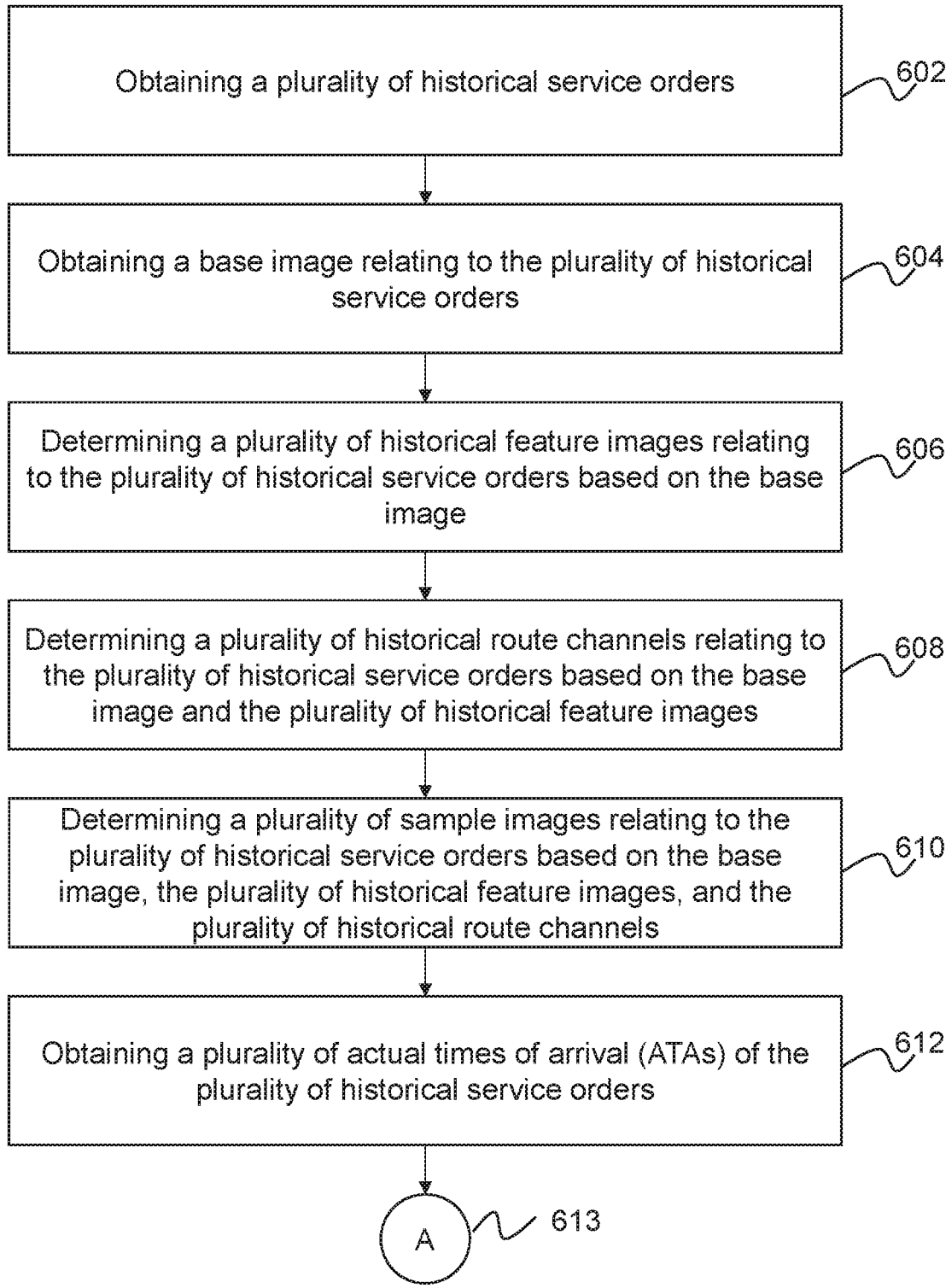
FIG. 6-A

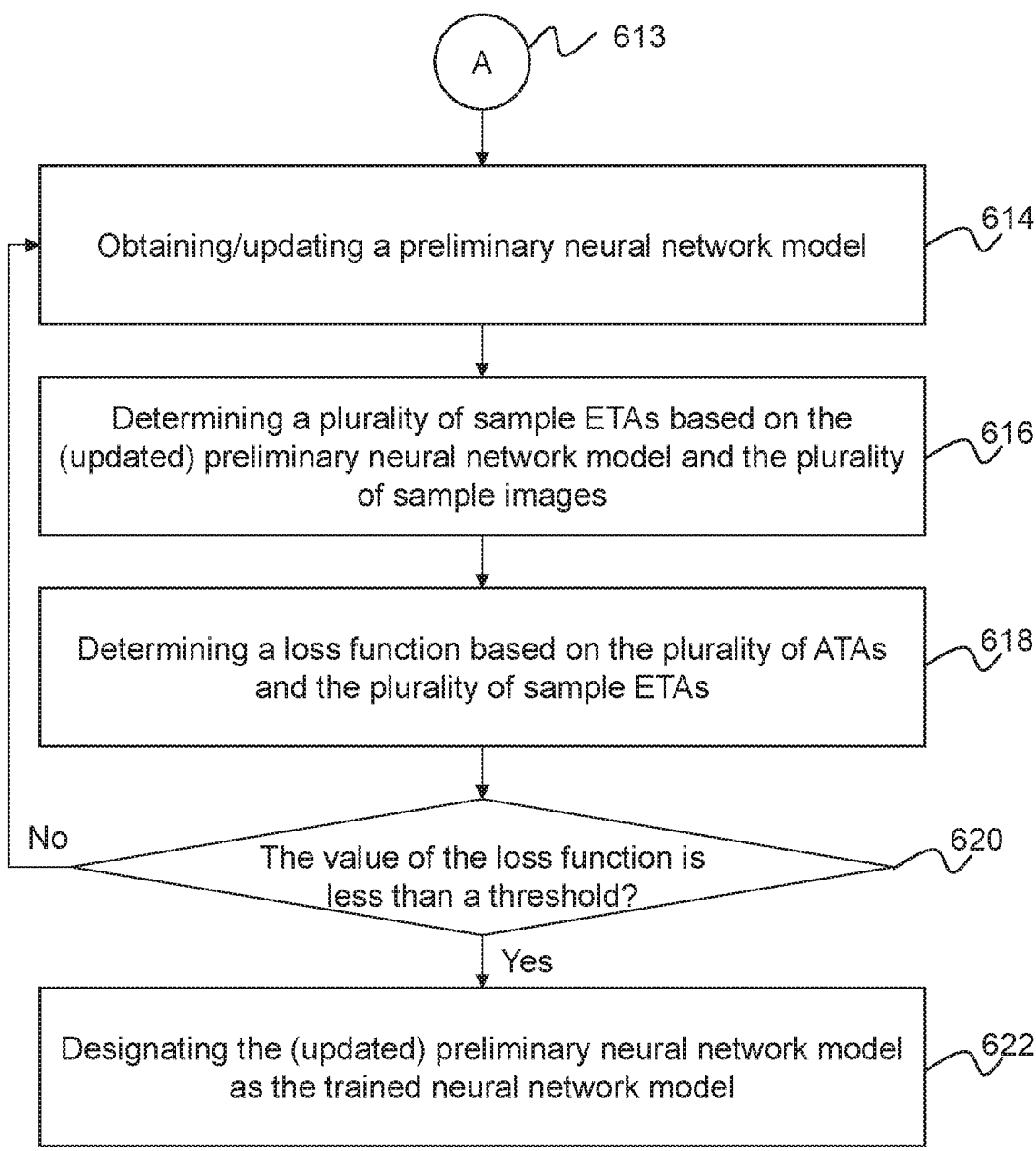
FIG. 6-B

SYSTEMS AND METHODS FOR DETERMINING AN ESTIMATED TIME OF ARRIVAL

CROSS-REFERENCE TO RELATED APPLICATIONS

This application is a Continuation of International Application No. PCT/CN2017/082163, filed on Apr. 27, 2017, the contents of which are incorporated herein by reference.

TECHNICAL FIELD

The present disclosure generally relates to systems and methods for digital planning for on-demand services, and in particular, to systems and methods for determining an estimated time of arrival (ETA) associated with a service request for an on-demand service.

BACKGROUND

On-demand transportation services utilizing Internet technology, such as online taxi services, have become increasingly popular because of their convenience. For a request including a start location and a destination, a system providing an on-demand transportation service may recommend a route that travels from the start location to the destination, and determine an estimated time of arrival (ETA) based on traffic information along the recommended route. However, in some situations, other than the traffic information along the recommended route, the ETA may be affected by other traffic information reasonably remote from the recommended route.

SUMMARY

One aspect of the present disclosure is directed to a system for determining an estimated time of arrival (ETA). The system may include a storage device including a set of instructions and at least one processor configured to communicate with the storage device and to execute the set of instructions to cause the system to perform one or more of the following operations. The system may obtain a service request from a terminal. The system may determine a reference image relating to the service request. The system may obtain a trained neural network model. The system may determine an ETA relating to the service request based on the reference image and the trained neural network model. The system may transmit the ETA to the terminal.

One aspect of the present disclosure is directed to a method for determining an ETA. The method may include one or more of the following operations. A service request may be obtained from a terminal. A reference image relating to the service request may be determined, A trained neural network model may be obtained. An ETA relating to the service request may be determined based on the reference image and the trained neural network model. The ETA may be transmitted to the terminal.

Yet another aspect of the present disclosure is directed to a non-transitory computer readable medium including executable instructions. When executed by at least one processor, the executable instructions may cause the medium to effectuate a method including one or more of the following operations. A service request may be obtained from a terminal. A reference image relating to the service request may be determined. A trained neural network model may be obtained. An ETA relating to the service request may be determined based on the reference image and the trained neural network model. The ETA may be transmitted to the terminal.

In some embodiments, the ETA may be stored in the storage device.

In some embodiments, a first base image relating to the service request may be obtained. A feature image relating to the service request may be determined based on the base image. A route channel relating to the service request may be obtained based on the base image and the feature image. The reference image relating to the service request may be determined based on the base image, the feature image, and the route channel.

In some embodiments, geographical information relating to the service request may be obtained. The first base image may be determined based on the geographical information.

In some embodiments, a plurality of historical service orders may be obtained. A second base image relating to the plurality of historical service orders may be obtained. A plurality of historical feature images relating to the plurality of historical service orders may be determined based on the second base image. A plurality of historical route channels relating to the plurality of historical service orders may be determined based on the second base image and the plurality of historical feature images. A plurality of sample images relating to the plurality of historical service orders may be determined based on the second base image, the plurality of historical feature images, and the plurality of historical route channels. The trained neural network model may be determined based on the plurality of sample images.

In some embodiments, a plurality of actual times of arrival (ATAs) of the plurality of historical service orders may be obtained. A preliminary neural network model may be obtained. A plurality of sample ETAs may be determined based on the preliminary neural network model and the plurality of sample images. A loss function may be determined based on the plurality of ATAs and the plurality of sample ETAs. Whether a value of the loss function is less than a threshold may be determined. The preliminary neural network model may be designated as the trained neural network model in response to the determination that the value of the loss function is less than the threshold.

In some embodiments, the preliminary neural network model may be updated in response to the determination that the value of the loss function is larger than or equal to the threshold.

In some embodiments, the preliminary neural network model may be a Convolutional Neural Network model.

In some embodiments, traffic information relating to the plurality of historical service orders may be determined. The plurality of historical feature images may be determined based on the traffic information.

In some embodiments, the traffic information may be normalized. The plurality of historical feature images relating to the plurality of historical service orders may be determined based on the normalized traffic information.

In some embodiments, the traffic information may include vehicle speed information relating to the plurality of historical service orders and/or traffic flow information relating to the plurality of historical service orders.

In some embodiments, for each of the plurality of historical service orders, a historical route relating to the each of the plurality of historical service orders may be determined on a historical feature image corresponding to the each of the plurality of historical service orders. A value may be assigned for the historical route on the historical feature image. A historical route channel corresponding to the each of the plurality of historical service orders may be determined based on the value and the historical feature image.

In some embodiments, the value for the historical route on the historical feature image may include −1 and/or 255.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6-A and FIG. 6-B illustrate a flowchart illustrating an exemplary process for determining a trained neural network model according to some embodiments of the present disclosure.

DETAILED DESCRIPTION

Figure 1:
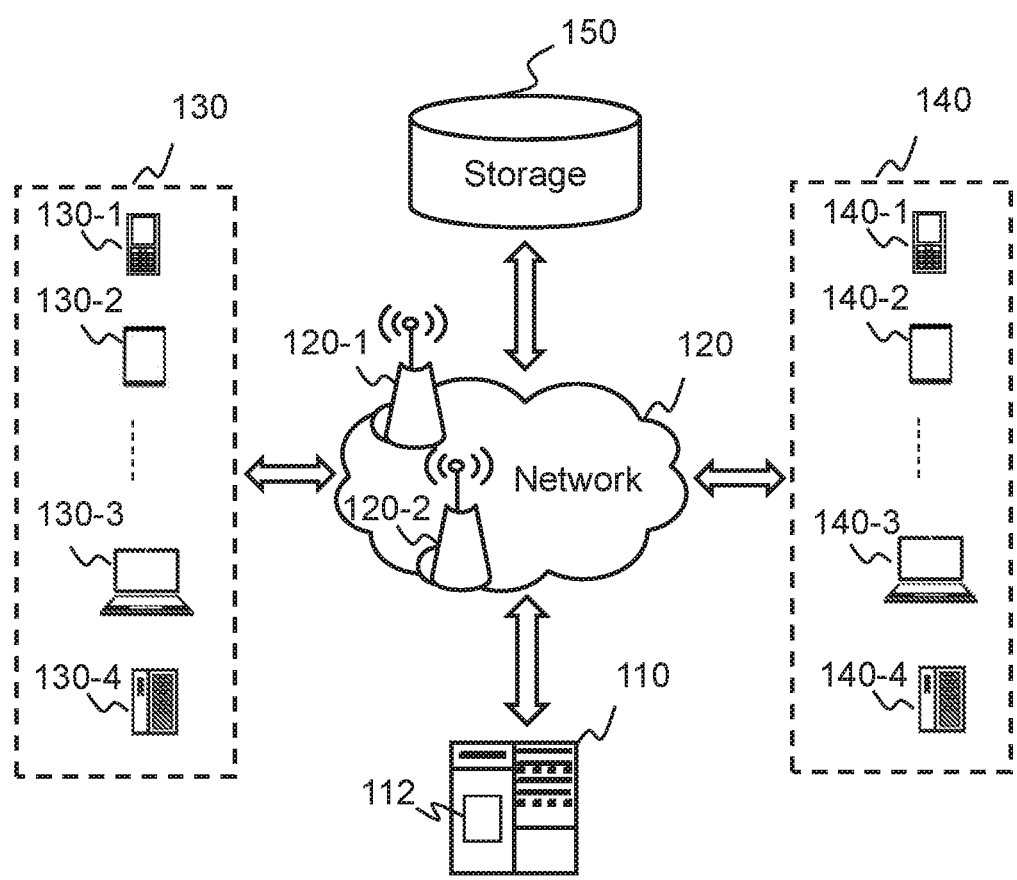
FIG. 1 is a schematic diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure are described primarily regarding determining an estimated time of arrival, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for transmitting and/or receiving an express. The application scenarios of the system or method of the present disclosure may include a web page, a plug-in of a browser, a client terminal, a custom system, an internal analysis system, an artificial intelligence robot, or the like, or any combination thereof.

The terms "passenger," "requestor," "service requestor," and "customer" in the present disclosure are used interchangeably to refer to an individual, an entity or a tool that may request or order a service. Also, the terms "driver," "provider," "service provider," and "supplier" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, terms "passenger" and "passenger terminal" may be used interchangeably, and terms "driver" and "driver terminal" may be used interchangeably.

The term "service request" in the present disclosure refers to a request that initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable, or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure provides online systems and methods for determining an ETA associated with a service request for an on-demand service based on a trained neural network model. Further, the systems and methods may transmit the ETA to a terminal associated with the service request. The systems and methods may obtain a plurality of historical service orders and determine the trained neural network model based on the plurality of historical service orders. For example, the systems and methods may determine a plurality of sample images corresponding to the plurality of historical service orders, and determine the trained neural network model based on a preliminary neural network model and the plurality of sample images.

It should be noted that online on-demand transportation services, such as online taxi hailing, is a new form of service rooted only in post-Internet era. It provides technical solutions to users and service providers that could raise only in post-Internet era. In pre-Internet era, when a user calls for a taxi on street, the taxi request and acceptance occur only between the passenger and one taxi driver that sees the passenger. If the passenger calls a taxi through telephone call, the service request and acceptance may occur only between the passenger and one service provider (e.g., one taxi company or agent). Online taxi hailing, however, allows a user of the service to real-time and automatic distribute a service request to a vast number of individual service providers (e.g., taxi) distance away from the user. It also allows a plurality of service providers to respond to the service request simultaneously and in real-time. Meanwhile, in modern societies, taxi service has become an industry of huge scale. Millions of passengers take taxis every day via online taxi hailing platforms. Only through the help of Internet can studying behaviors of the passengers' taxiing behavior becomes possible. Accordingly, prediction of taxi hailing through a passenger's online taxi hailing activity, is also a new form of service rooted only in post Internet era.

FIG. 1 is a schematic diagram of an exemplary on-demand service system 100 according to some embodiments of the present disclosure. For example, the on-demand service system 100 may be an online transportation service platform for transportation services such as taxi hailing, chauffeur services, delivery vehicles, carpool, bus service, driver hiring, and shuttle services. The on-demand service system 100 may be an online platform including a server 110, a network 120, a requestor terminal 130, a provider terminal 140, and a storage 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the storage 150 via the network 120. As another example, the server 110 may connect the requestor terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may determine an ETA associated with a service request for an on-demand service based on a trained neural network model. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the on-demand service system 100 (e.g., the server 110, the requestor terminal 130, the provider terminal 140, and the storage 150) may transmit information and/or data to other component(s) in the on-demand service system 100 via the network 120. For example, the server 110 may receive a service request from the requestor terminal 130 via the network 120. In some embodiments, the network 120 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information between them.

In some embodiments, a requestor may be a user of the requestor terminal 130. In some embodiments, the user of the requestor terminal 130 may be someone other than the requestor. For example, a user A of the requestor terminal 130 may use the requestor terminal 130 to transmit a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requester" and "requester terminal" may be used interchangeably, and "provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (FDA), a gaming device, a navigation device, a point of sale (FOS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™ a Gear VR™, etc. In some embodiments, built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be similar to, or the same device as the requestor terminal 130. In some embodiments, the provider terminal 140 may be a device with positioning technology for locating the position of the provider and/or the provider terminal 140. In some embodiments, the requestor terminal 130 and/or the provider terminal 140 may communicate with another positioning device to determine the position of the requestor, the requestor terminal 130, the provider, and/or the provider terminal 140. In some embodiments, the requestor terminal 130 and/or the provider terminal 140 may transmit positioning information to the server 110.

The storage 150 may store data and/or instructions. In some embodiments, the storage 150 may store data obtained from the requestor terminal 130 and/or the provider terminal 140. In some embodiments, the storage 150 may store data and/or instructions that the server 110 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the on-demand service system 100 (e.g., the server 110, the requestor terminal 130, the provider terminal 140). One or more components in the on-demand service system 100 may access the data or instructions stored in the storage 150 via the network 120. In some embodiments, the storage 150 may be directly connected to or communicate with one or more components in the on-demand service system 100 (e.g., the server 110, the requestor terminal 130, the provider terminal 140). In some embodiments, the storage 150 may be part of the server 110.

In some embodiments, one or more components of the on-demand service system 100 (e.g., the server 110, the requestor terminal 130, the provider terminal 140) may access the storage 150. In some embodiments, one or more components of the on-demand service system 100 may read and/or modify information relating to the requester, provider, and/or the public when one or more conditions are met. For example, the server 110 may read and/or modify one or more users' information after a service. As another example, the provider terminal 140 may access information relating to the requestor when receiving a service request from the requestor terminal 130, but the provider terminal 140 may not modify the relevant information of the requestor.

In some embodiments, information exchanging of one or more components of the on-demand service system 100 may be achieved by way of requesting a service. The object of the service request may be any product. In some embodiments, the product may be a tangible product, or immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (FDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

It should be noted that the application scenario illustrated in FIG. 1 is only provided for illustration purposes, and not intended to limit the scope of the present disclosure. For example, the on-demand system 100 may be used as a navigation system. The navigation system may include a user terminal (e.g., the requester terminal 130 or the provider terminal 140) and a server (e.g., the server 110). A user may input a start location, a destination, and/or a start time via the user terminal. The navigation system may accordingly determine an ETA based on the start location, the destination, and/or the start time according to the process and/or method described in this disclosure.

Figure 2:
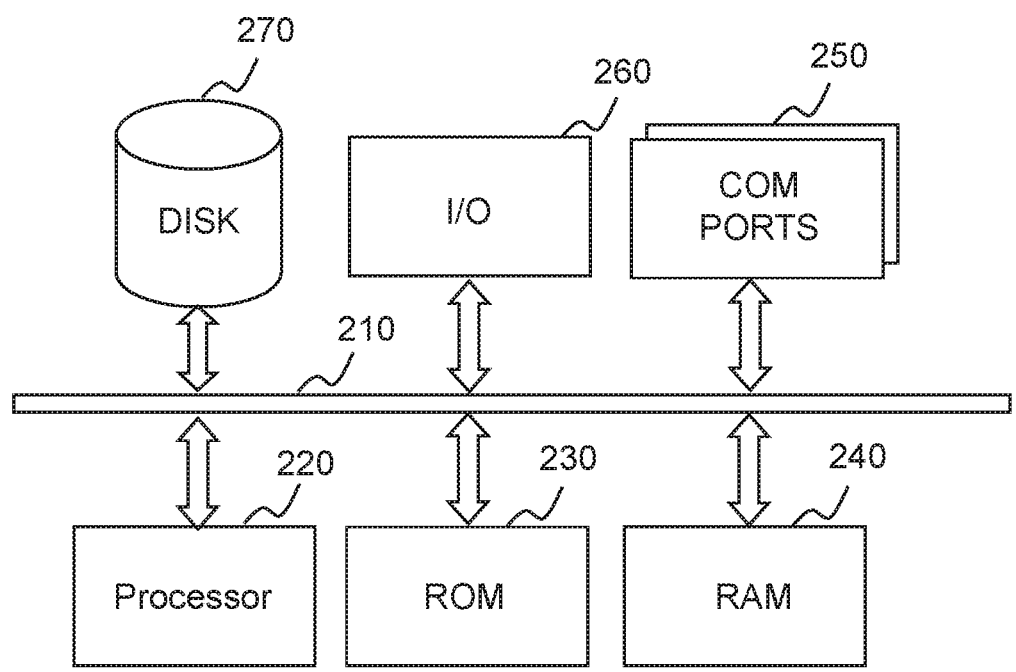
FIG. 2 is a schematic diagram illustrating an exemplary computing device in the on-demand service system according to some embodiments of the present disclosure.

FIG. 2 is a schematic diagram illustrating exemplary hardware and software components of a computing device 200 on which the server 110, the requester terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general-purpose computer or a special purpose computer; both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors, for executing program instructions. The exemplary computing device may include an internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
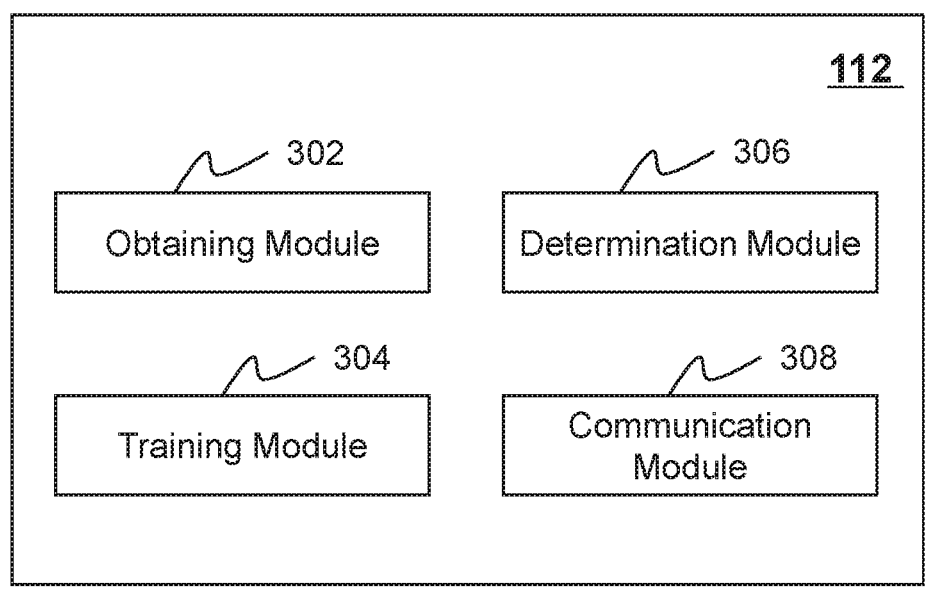
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include an obtaining module 302, a training module 304, a determination module 306, and a communication module 308.

The obtaining module 302 may be configured to obtain a service request. The obtaining module 302 may obtain the service request from the requestor terminal 130 via the network 120. The service request may be a request for a transportation service (e.g., a taxi service). The service request may include a start location, a destination, and/or a start time related to the service. In some embodiments, the obtaining module 302 may determine a reference image (e.g., a grey-scale image) relating to the service request. The reference image relating to the service request may indicate the geographic information, traffic information, and/or route information relating to the service request.

The training module 304 may be configured to obtain or determine a trained neural network model that may be used to determine an ETA relating to the service request. The training module 304 may determine the trained neural network model based on a plurality of historical service orders. For example, the training module 304 may determine a base image, a plurality of historical feature images, and a plurality of historical route channels relating to the plurality of historical service orders. The training module 304 may further determine a plurality of sample images based on the base image, the plurality of historical feature images, and the plurality of historical route channels. The training module 304 may obtain a preliminary neural network model and train the preliminary neural network model based on the plurality of sample images. The trained neural network model may be transmitted to the determination module 306 or may be stored in any storage device (e.g., the storage 150) disclosed elsewhere in the present disclosure.

The determination module 306 may be configured to determine an ETA relating to the service request based on the trained neural network model. As described in connection with the obtaining module 302, the determination module 306 may determine the ETA based on the reference image relating to the service request and the trained neural network model. In some embodiments, the obtaining module 302 may transmit the service request to the determination module 306 and the determination module 306 may determine the reference image relating to the service request.

The communication module 308 may be configured to transmit the ETA relating to the service request to the requestor terminal 130 and/or the provider terminal 140 to be displayed. In some embodiments, the ETA may be displayed on the requestor terminal 130 and/or the provider terminal 140 via a user interface (not shown). In some embodiments, the ETA may be displayed in a format of, for example, text, images, audios, videos, etc. In some embodiments, the communication module 308 may transmit the ETA to the requestor terminal 130 and/or the provider terminal 140 via a suitable communication protocol (e.g., the Hypertext Transfer Protocol (HTTP), Address Resolution Protocol (ARP), Dynamic Host Configuration Protocol (DHCP), File Transfer Protocol (FTP)).

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the obtaining module 302 and the determination module 306 may be combined as a single module which may both obtain a service request and determine an ETA relating to the service request based on a trained neural network model. As another example, the processing engine 112 may include a storage module (not shown) used to store the service request, the trained neural network model, the ETA, and/or any information associated with the service request.

Figure 4:
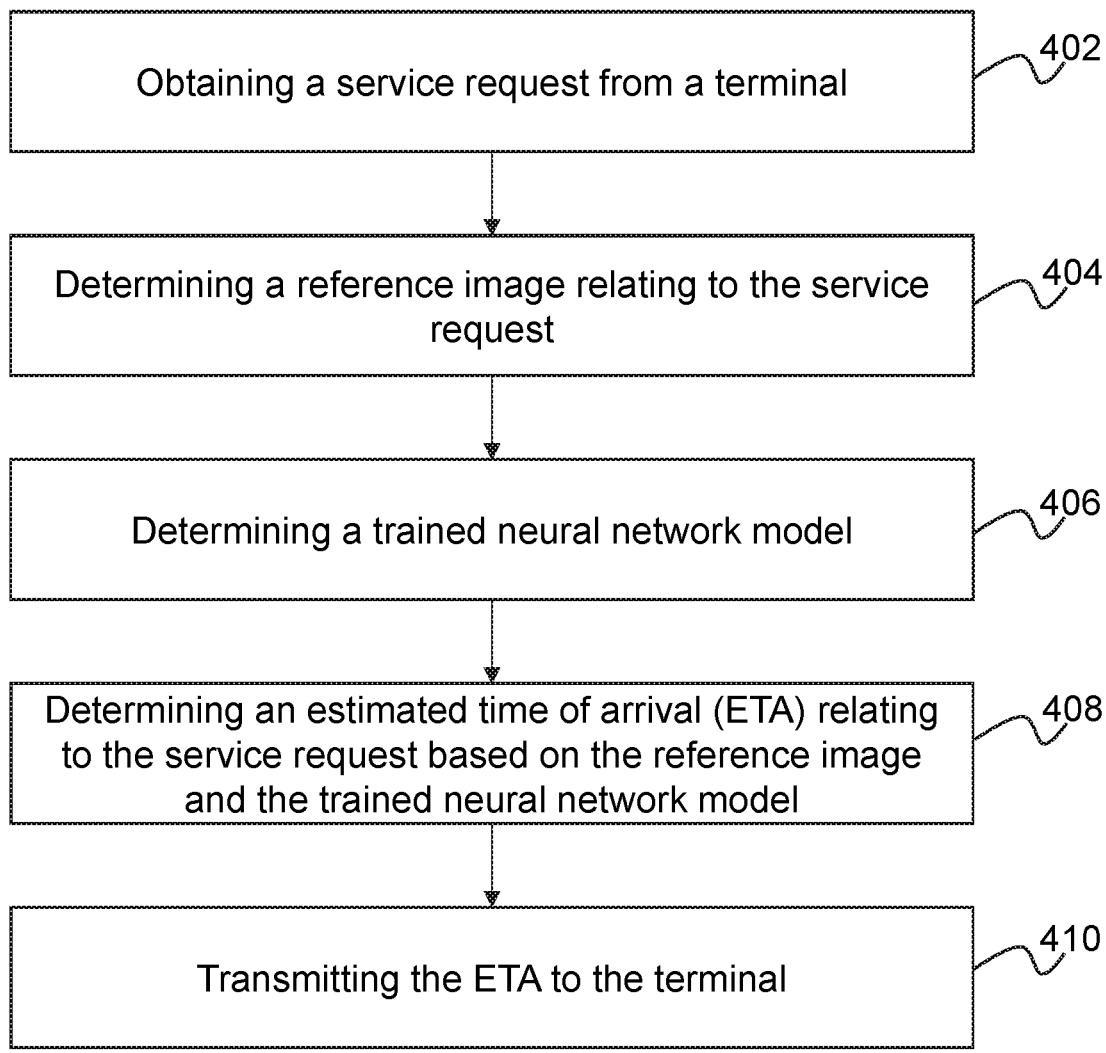
FIG. 4 is a flowchart illustrating an exemplary process for determining an ETA relating to a service request according to some embodiments of the present disclosure.

FIG. 4 is a flowchart illustrating an exemplary process for determining an ETA relating to a service request according to some embodiments of the present disclosure. The process 400 may be executed by the on-demand service system 100. For example, the process 400 may be implemented as a set of instructions (e.g., an application) stored in the storage ROM 230 or RAM 240. The processor 220 may execute the set of instructions, and when executing the instructions, it may be configured to perform the process 400. The operations of the illustrated process presented below are intended to be illustrative. In some embodiments, the process 400 may be accomplished with one or more additional operations not described and/or without one or more of the operations discussed. Additionally, the order in which the operations of the process as illustrated in FIG. 4 and described below is not intended to be limiting.

In 402, the processing engine 112 may obtain a service request from the requester terminal 130. The service request may be a request for a transportation service (e.g., a taxi service). The service request may include a start location, a destination, a start time, etc. As used herein, the start location generally refers to a location where a service provider may pick up the requestor. The destination generally refers to a location where the service provider may drop off the requestor. The start time generally refers to a time point when the requestor wishes to use the transportation service.

The service request may include a real-time request, an appointment request, and/or any other request for one or more types of services. As used herein, the real-time request may indicate that the requestor wishes to use a transportation service at the present moment or at a defined time reasonably close to the present moment for an ordinary person in the art. For example, a request may be a real-time request if the defined time is shorter than a threshold value, such as 1 minute, 5 minutes, 10 minutes, 20 minutes, etc. The appointment request may indicate that the requestor wishes to schedule a transportation service in advance (e.g., at a defined time which is reasonably far from the present moment for the ordinary person in the art). For example, a request may be an appointment request if the defined time is longer than a threshold value, such as 20 minutes, 2 hours, 1 day, etc. In some embodiments, the processing engine 112 may define the real-time request or the appointment request based on a time threshold. The time threshold may be default settings of the on-demand service system 100 or may be adjustable in different situations. For example, in a traffic peak period, the time threshold may be relatively small (e.g., 10 minutes). In an idle period (e.g., 10:00-12:00 am), the time threshold may be relatively large (e.g., 1 hour).

In 404, the processing engine 112 may determine a reference image relating to the service request. The reference image relating to the service request may be a grey-scale image including a plurality of pixels. The plurality of pixels may correspond to a plurality of pixel values within a range from 0 to 255. In some embodiments, the processing engine 112 may determine the reference image based on the reference information relating to the service request. The reference information relating to the service request may include the geographic information, traffic information, and/or route information relating to the service request.

In 406, the processing engine 112 may obtain or determine a trained neural network model. In some embodiments, the processing engine 112 may determine the trained neural network model by training a preliminary neural network model based on a plurality of historical service orders. For example, the processing engine 112 may determine a plurality of sample images corresponding to the plurality of historical service orders and further train the preliminary neural network model based on the plurality of sample images.

In some embodiments, the trained neural network model may be a convolutional neural network (CNN) model relating to deep learning. The CNN model may include a plurality of processing layers (e.g., an input layer, a convolutional layer, a pooling layer, a fully connected layer, an output layer) illustrated in FIG. 7.

In 408, the processing engine 112 may determine an ETA relating to the service request based on the reference image relating to the service request and the trained neural network model. For example, the processing engine 112 may receive the reference image relating to the service request and perform a convolution on the reference image based on the CNN model. The processing engine 112 may further determine the ETA relating to the service request based on the convolution.

In 410, the processing engine 112 may transmit the ETA to the requester terminal 130 and/or the provider terminal 140 via the network 120, In some embodiments, the processing engine 112 may save the ETA into a storage device (e.g., the storage 150) as disclosed elsewhere in the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 400. In the storing step, the processing engine 112 may store the service request, the reference image relating to the service request, the trained neural network model, and/or the ETA in a storage device (e.g., the storage 150) disclosed elsewhere in the present disclosure.

Figure 5:
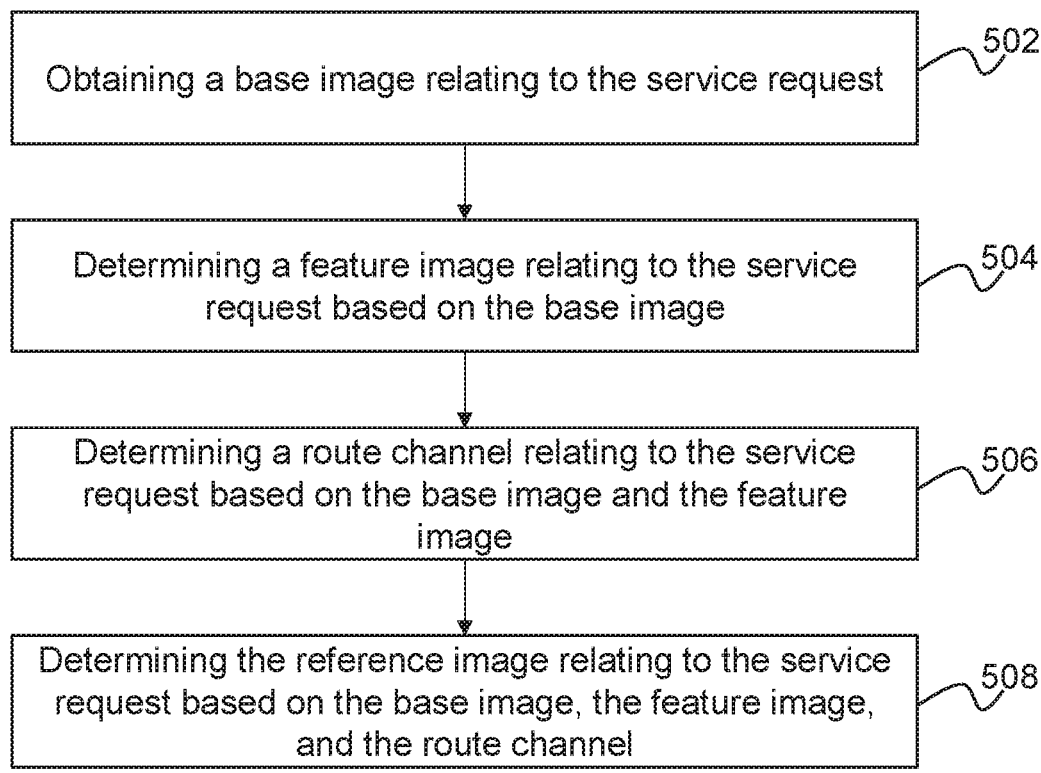
FIG. 5 is a flowchart illustrating an exemplary process for determining a reference image relating to a service request according to some embodiments of the present disclosure.

In some embodiments, step 404 of process 400 may be performed based on an exemplary process 500 illustrated in FIG. 5 for determining a reference image relating to a service request. The process 500 may be executed by the on-demand service system 100. For example, the process 500 may be implemented as a set of instructions (e.g., an application) stored in the storage ROM 230 or RAM 240.

The processor 220 may execute the set of instructions and, when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 502, the processing engine 112 may obtain a base image relating to the service request. The base image may be an image indicative of the geographic information relating to the service request. For example, the service request may include a start location and a destination. The start location may be in a region A (e.g., city A, a portion of city A) and the destination may be in a region B (e.g., city B, a portion of city B). The region A may be the same as or different with the region B. If the region A is the same as the region B, the base image may be an image indicative of the geographic information of the region. If the region A is different with the region B, the base image may be an image indicative of the geographic information of a combination of the region A and the region B. For convenience, in this disclosure the region A and the region B may refer to a same region (e.g., Beijing, China). The geographic information may include information relating to buildings (e.g., a school, an office building, a market), information relating to roads or streets, etc. The information relating to buildings may include, for example, locations of the buildings, a distribution of the buildings, a density of the buildings. The information relating to roads or streets may include the amount of the roads or streets, a distribution of the roads or streets, a density of the roads or streets, widths of the roads or streets, lengths of the roads or streets, etc.

In some embodiments, the base image may be a two-dimensional (2D) grey-scale image. The grey-scale image may include a plurality of pixels. Each of the plurality of pixels may have a gray value that is within a range from 0 to 255. The gray value may indicate a brightness of the corresponding pixel. In some embodiments, the processing engine 112 may obtain the base image from a map service provider (e.g., a Google Map™, a Tencent Map™, a Baidu Map™).

In 504, the processing engine 112 may determine a feature image relating to the service request. The feature image may indicate traffic information relating to the service request. The traffic information may include traffic speed, traffic flow, traffic density, etc. The processing engine 112 may obtain the traffic information from the storage 150, a map service provider (e.g., a Google Map™, a Tencent Map™, a Baidu Map™), and/or any other device and/or service provider that can provide traffic information relating to a service request.

For example, in response to receiving a real-time request, the processing engine 112 may determine a start location A and a destination B based on the real-time request. The processing engine 112 may access the storage 150 to obtain real-time traffic status relating to a region associated with the start location A and/or the destination B (e.g., a city where the start location A and the destination B are located).

As another example, in response to receiving an appointment request, the processing engine 112 may determine a start location C, a destination D, and a start time 7:00 p.m. on next Monday based on the appointment request. The processing engine 112 may access the storage 150 to obtain historical traffic information around 7:00 p.m. in a region associated with the start location C and/or the destination D (e.g., a city where the start location C and the destination D are located) on the last Monday(s) (e.g., last two Mondays, last three Mondays, last four Mondays).

In some embodiments, the feature image may include a plurality of channels. Each of the plurality of channels may include a type of traffic information. For example, the feature image may include a first channel and a second channel. The first channel may correspond to the traffic speed and the second channel may correspond to the traffic flow. The traffic speed generally refers to an average speed of vehicles at a specific location (e.g., 30 km/h, 40 km/h, 50 km/h). The traffic flow generally refers to the number of vehicles passing through a specific location per unit (e.g., per hour, per minute).

In some embodiments, the feature image may be a grey-scale image. The processing engine 112 may normalize the traffic information to a value range (e.g., a value range from 0 to 255). For example, for the first channel, the processing engine 112 may normalize the traffic speed to the value range according to a normalization algorithm. The normalization algorithm may include a min-max normalization algorithm, a z-score normalization algorithm, or the like, or a combination thereof.

In some embodiments, the feature image may be designated as a layer being above the base image. The feature image may be a 2D grey-scale image including a plurality of pixels. The size of the feature image may be the same as that of the base image. The plurality of pixels of the feature image may accordingly correspond to the plurality of pixels of the base image.

In 506, the processing engine 112 may determine a route channel relating to the service request based on the base image and the feature image. In some embodiments, the route channel may be designated as a layer being above the feature image. In some embodiments, the route channel may be designated as a channel on the feature image. The processing engine 112 may determine a recommended route based on the start location and the destination of the service request. The recommended route may be a route along at least a portion of a road or a street. The processing engine 112 may determine a plurality of pixels corresponding to the recommended route and further assign a value (e.g., −1, 255) to each of the plurality of pixels. The processing engine 112 may determine the route channel based on the plurality of pixels corresponding to the recommended route and the assigned value on the feature image. In some embodiments, the assigned value may be within a value range (e.g., from −1 to 50, from −1 to 100, from 150 to 255, from 200 to 255).

In 508, the processing engine 112 may determine the reference image relating to the service request based on the base image, the feature image, and the route channel. The processing engine 112 may combine the base image, the feature image, and the route channel as the reference image relating to the service request.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 500. As another example, step 502 and step 504 may be combined as a single step in which the processing engine 112 may both determine the base image and the feature image.

Back to FIG. 4, in some embodiments, step 406 of process 400 may be performed based on an exemplary process 600 illustrated in FIG. 6 for determining a trained neural network model. The process 600 may be executed by the on-demand service system 100. For example, the process 600 may be implemented as a set of instructions (e.g., an application) stored on the storage ROM 230 or RAM 240. The processor 220 may execute the set of instructions and, when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 602, the processing engine 112 may obtain a plurality of historical service orders. In some embodiments, the processing engine 112 may obtain the plurality of historical service orders from the storage 150 via the network 120. In some embodiments, the processing engine 112 may obtain the plurality of historical service orders from a storage module (not shown) in the processing engine 112. The processing engine 112 may obtain the plurality of historical service orders within a time period (e.g., the past 1 month, the past 2 months). As used herein, the term "historical service order" generally refers to a service request that has been completed. For example, a requestor may send a service request for a service (e.g., a transportation service) to the on-demand service system 100. A service provider may accept the service request and provide the service to the requestor, indicating that the service request has been completed. The on-demand service system 100 may save this service request as a historical service order into a storage device (e.g., the storage 150) which may include a historical start location, a historical destination, a historical start time, a historical time of arrival (also referred to as "actual time of arrival"), etc.

In 604, the processing engine 112 may obtain a base image relating to the plurality of historical service orders. As described in connection with step 502, the base image may be an image indicative of the geographic information of a region where historical start locations and/or historical destinations of the plurality of historical service orders are within. In some embodiments, the base image relating to the plurality of historical service orders may be the same as the base image described in connection with step 502. In some embodiments, the geographic information of the region may be updated when new information is available (e.g., a new building may be newly built). In this situation, the base image relating to the plurality of historical service orders may be different with that described in connection with step 502. It should be noted that the geographic information of the region may remain unchanged during a specific time period, and for convenience, in this disclosure the base images described in connection with steps 604 and 502 may refer to the same image.

In 606, the processing engine 112 may determine a plurality of historical feature images relating to the plurality of historical service orders based on the base image. For each of the plurality of historical service orders, the processing engine 112 may determine a historical feature image corresponding to each of the historical service orders. As described in connection with step 504, a historical feature image may include historical traffic information relating to a historical service order. The processing engine 112 may obtain the historical traffic information from the storage 150, a map service provider (e.g., a Google Map™, a Tencent Map™, a Baidu Map™), and/or any other device and/or service that may provide traffic information. For example, for a specific historical service order, the processing engine 112 may determine a start location M, a destination N, a start time T, an arrival time T' based on the specific historical service order. The processing engine 112 may access the storage 150 to obtain historical traffic information of the start time T, the arrival time T', or a time point between the start time T and the arrival time T' relating to a region (e.g., a city) associated with the start location M and/or the destination N.

As described in connection with step 504, each of the plurality of historical feature images may include a plurality of channels (e.g., a channel for traffic speed, a channel for traffic flow). The processing engine 112 may normalize the historical traffic information to a value range (e.g., a value range from 0 to 255) based on a normalization algorithm.

In 608, the processing engine 112 may determine a plurality of historical route channels relating to the plurality of historical service orders based on the base image and the plurality of historical feature images. As described in connection with step 506, for each of the plurality of historical service orders, the processing engine 112 may obtain a historical route from a historical start location to a historical destination. The processing engine 112 may assign a value (e.g., −1, 255) to the historical route and further generate a historical route channel based on the historical route on the corresponding feature image.

In 610, the processing engine 112 may determine a plurality of sample images relating to the plurality of historical service orders based on the base image, the plurality of historical feature images, and the plurality of historical route channels. For each of the plurality of historical service orders, the processing engine 112 may determine a sample image. The processing engine 112 may combine the base image, the corresponding historical feature image, and the corresponding historical route channel relating to the historical service order as the sample image.

In 612, the processing engine 112 may obtain a plurality of actual times of arrival (ATAs) of the plurality of historical service orders. The processing engine 112 may obtain the plurality of ATAs from the storage 150 via the network 120. For each of the plurality of historical service orders, the ATA may be a time point at which the service provider dropped off the passenger.

The processing engine 112 may proceed to node A 613 and perform at least some of steps starting from node A 613 illustrated in FIG. 6-B.

In 614, the processing engine 112 may obtain a preliminary neural network model. The preliminary neural network model may include default settings by the on-demand service system 100 or may be adjustable in different situations. The preliminary neural network model may be a CNN model illustrated in FIG. 7. The CNN model may include a plurality of parameters, for example, the number of kernels, sizes of the kernels, the number of processing layers, etc. The parameters of the preliminary neural network model (herein referred to as "preliminary parameters") may include default settings by the on-demand service system 100 or may be adjustable in different situations.

In 616, the processing engine 112 may determine a plurality of sample ETAs based on the preliminary neural network model and the plurality of sample images. The processing engine 112 may input the plurality of sample images to the preliminary neural network model and determine the plurality of sample ETAs based on the plurality of preliminary parameters.

In 618, the processing engine 112 may determine a loss function based on the plurality of ATAs and the plurality of sample ETAS. The loss function may indicate an accuracy of the preliminary neural network model. In some embodiments, the processing engine 112 may determine the loss function based on a difference between the plurality of ATAs and the plurality of sample ETAs.

In 620, the processing engine 112 may determine whether the value of the loss function (e.g., the difference between the plurality of ATAs and the plurality of sample ETAs) is less than a threshold. The threshold may be default settings by the on-demand service system 100 or may be adjustable in different situations.

In response to the determination that the value of the loss function is less than the threshold, the processing engine 112 may designate the preliminary neural network model as the trained neural network model in 622. On the other hand, in response to the determination that the value of the loss function is larger than or equal to the threshold, the processing engine 112 may execute the process 600 to return to 614 to update the preliminary neural network model until the value of the loss function is less than the threshold. For example, the processing engine 112 may update the plurality of preliminary parameters (e.g., the number of kernels, sizes of the kernels, the number of the processing layers). Further, if the processing engine 112 determines that under the updated parameters, the value of the loss function is less than the threshold, the processing engine 112 may designate the updated preliminary neural network model as the trained neural network model in step 622. On the other hand, if the processing engine 112 determines that under the updated parameters, the value of the loss function is larger than or equal to the threshold, the processing engine 112 may still execute the process 600 to return to 614 to further update the parameters. The iteration from steps 614 through 620 may continue until the processing engine 112 determines that under newly updated parameters the value of the loss function is less than the threshold, and the processing engine 112 may designate the updated preliminary neural network model as the trained neural network model.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step) may be added elsewhere in the exemplary process 600. In the storing step, the processing engine 112 may store the trained neural network model in a storage device (e.g., the storage 150) disclosed elsewhere in the present disclosure.

Figure 7:
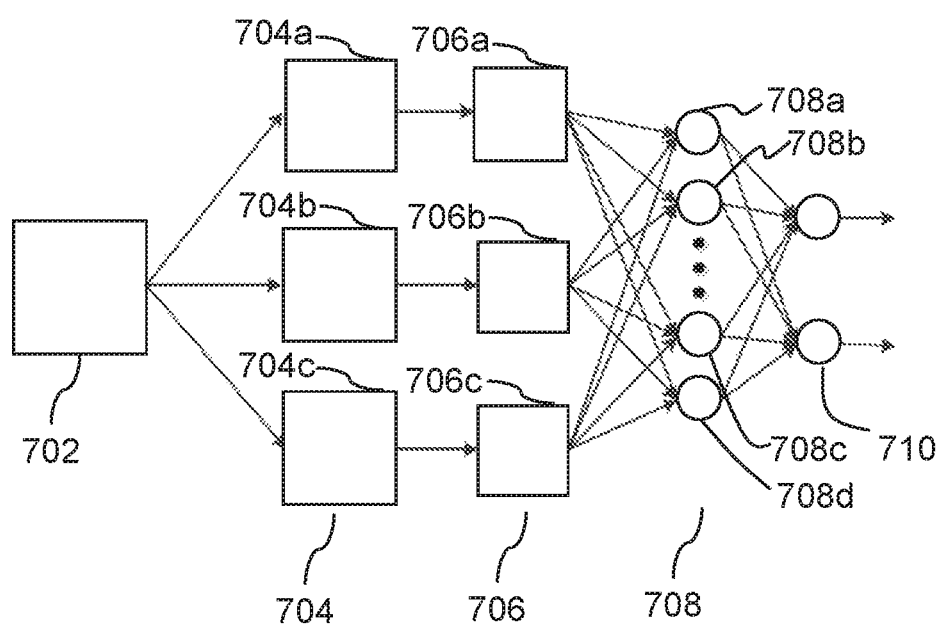
FIG. 7 is a schematic diagram illustrating an exemplary convolutional neural network (CNN) model according to some embodiments of the present disclosure.

FIG. 7 is a schematic diagram illustrating an exemplary CNN model 700 according to some embodiments of the present disclosure. The CNN model may include an input layer 702, a convolutional layer 704, a pooling layer 706, a fully connected layer 708, and an output layer 710.

As described in connection with steps 402 and 404, the processing engine 112 may determine a reference image relating to a service request. The reference image relating to the service request may be expressed as a matrix including a plurality of elements. Each of the plurality of elements in the matrix may correspond to a pixel value of the reference image. The processing engine 112 may input the reference image to the CNN model via the input layer 702. Further, the reference image relating to the service request may be processed in the convolutional layer 704.

The convolutional layer 704 may include a plurality of kernels (e.g., 704a, 704b, 704c). In some embodiments, in the convolutional layer 704, the processing engine 112 may extract features of the reference image relating to the service request. For example, each of the plurality of kernels may receive a portion of the reference image, the processing engine 112 may perform a convolution on the portion of the reference image and further extract a feature corresponding to the portion of the reference image. The feature may relate to traffic information, geographic information, etc.

The pooling layer 706 may include a plurality of pooling nodes (e.g., 706a, 706b, 706c). The plurality of pooling nodes may be used to reduce the computing requirement of data processing and increase the speed of data processing. For example, the processing engine 112 may reduce the spatial size of the matrix corresponding to the reference image relating to the service request in the pooling layer 706.

The fully connected layer 708 may include a plurality of connected nodes (e.g., 708a, 708b, 708c, 708d). As illustrated in FIG. 7, the plurality of connected nodes may be connected to the plurality of pooling nodes. In the fully connected layer 708, the processing engine 112 may determine a plurality of vectors corresponding to the plurality of connected nodes based on the features of the reference image and further weigh the plurality of vectors according to a plurality of weighting coefficients. In some embodiments, the CNN model may include a plurality of connected layers.

In the output layer 710, the processing engine 112 may determine an ETA relating to the service request based on the plurality of vectors and the plurality of weighting coefficients obtained in the fully connected layer 708.

It should be noted that the above description of the CNN model is provided for the purpose of illustration, and not intended to limit the scope of the present disclosure. For persons having ordinary skills in the art, modules may be combined in various ways, or connected with other modules as sub-systems. Various variations and modifications may be conducted under the teaching of the present disclosure. However, those variations and modifications may not depart from the spirit and scope of this disclosure. For example, the plurality of parameters (e.g., the number of the kernels, sizes of the kernels, the number of the layers) associated with the CNN model may be adjustable under different situations.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the users computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system for determining an estimated time of arrival (ETA), comprising:
 a storage device including a set of instructions; and
 processing circuits in communication with the storage device, wherein when executing the set of instructions, the processing circuits are directed to:
  obtain signals including a service request from a terminal, wherein the service request is inputted by a user via the terminal;
  determine a reference image relating to the service request, the reference image indicating geographic information, traffic information, and route information relating to the service request;
  obtain signals including a trained neural network model;
  determine an ETA relating to the service request based on the reference image using the trained neural network model; and
  transmit signals including the ETA to the terminal to make an interface of the terminal display the ETA.

2. The system of claim 1, wherein determining reference image relating to the service request, the processing circuits are further directed to:
 obtain signals including a first base image relating to the service request;
 determine a feature image relating to the service request based on the base image;
 obtain signals including a route channel relating to the service request based on the base image and the feature image; and
 determine the reference image relating to the service request based on the base image, the feature image, and the route channel.

3. The system of claim 2, wherein to obtain the signals including the first base image relating to the service request, the processing circuits are further directed to:
 obtain signals including the geographical information relating to the service request; and
 determine the first base image based on the geographical information.

4. The system of claim 1, wherein the trained neural network model is generated based on a process for determining a trained neural network model, the process comprising:
 obtaining signals including a plurality of historical service orders;
 obtaining signals including a second base image relating to the plurality of historical service orders;
 determining a plurality of historical feature images relating to the plurality of historical service orders based on the second base image;

determining a plurality of historical route channels relating to the plurality of historical service orders based on the second base image and the plurality of historical feature images;

determining a plurality of sample images relating to the plurality of historical service orders based on the second base image, the plurality of historical feature images, and the plurality of historical route channels; and determining the trained neural network model based on the plurality of sample images.

5. The system of claim 4, wherein the process for generating a trained neural network model further comprises:

obtaining signals including a plurality of actual times of arrival (ATAs) of the plurality of historical service orders;

obtaining signals including a preliminary neural network model;

determining a plurality of sample ETAs based on the preliminary neural network model and the plurality of sample images;

determining a loss function based on the plurality of ATAs and the plurality of sample ETAs;

determining whether a value of the loss function is less than a threshold;

designating the preliminary neural network model as the trained neural network model in response to the determination that the value of the loss function is less than the threshold; and updating the preliminary neural network model in response to the determination that the value of the loss function is larger than or equal to the threshold.

6. The system of claim 5, wherein the preliminary neural network model is a Convolutional Neural Network model.

7. The system of claim 4, wherein the determining the plurality of historical feature images relating to the plurality of historical service orders includes:

determining traffic information relating to the plurality of historical service orders; and determining the plurality of historical feature images based on the traffic information.

8. The system of claim 7, wherein the determining the plurality of historical feature images relating to the plurality of historical service orders includes:

normalizing the traffic information; and determining the plurality of historical feature images relating to the plurality of historical service orders based on the normalized traffic information.

9. The system of claim 7, wherein the traffic information includes vehicle speed information relating to the plurality of historical service orders or traffic flow information relating to the plurality of historical service orders.

10. The system of claim 4, wherein the determining a plurality of historical route channels relating to the plurality of historical service orders includes:

for each of the plurality of historical service orders,
determining a historical route relating to the each of the plurality of historical service orders on a historical feature image corresponding to the each of the plurality of historical service orders,
assigning a value for the historical route on the historical feature image, and
determining a historical route channel corresponding to the each of the plurality of historical service orders based on the value and the historical feature image.

11. The system of claim 10, wherein the value for the historical route on the historical feature image is −1 or 255.

12. A method for determining an estimated time of arrival (ETA), implemented on a computing device having processing circuits, at least one non-transitory computer-readable storage medium, and a communication platform connected to a network, comprising:

obtaining, by the processing circuits, signals including a service request from a terminal, wherein the service request is inputted by a user via the terminal;

determining, by the processing circuits, a reference image relating to the service request, the reference image indicating geographic information, traffic information, and route information relating to the service request;

obtaining, by the processing circuits, signals including a trained neural network model;

determining, by the processing circuits, an ETA relating to the service request based on the reference image using the trained neural network model; and transmitting, by the processing circuits, signals including the ETA to the terminal to make an interface of the terminal display the ETA.

13. The method of claim 12, wherein determining the reference image relating to the service request includes:

obtaining signals including a first base image relating to the service request;

determining a feature image relating to the service request based on the base image;

obtaining signals including a route channel relating to the service request based on the base image and the feature image; and determining the reference image relating to the service request based on the base image, the feature image, and the route channel.

14. The method of claim 13, wherein obtaining the signals including the first base image relating to the service request includes:

obtaining signals including the geographical information relating to the service request; and determining the first base image based on the geographical information.

15. The method of claim 12, wherein the trained neural network model is generated based on a process for determining a trained neural network model, the process comprising:

obtaining signals including a plurality of historical service orders;

obtaining signals including a second base image relating to the plurality of historical service orders;

determining a plurality of historical feature images relating to the plurality of historical service orders based on the second base image;

determining a plurality of historical route channels relating to the plurality of historical service orders based on the second base image and the plurality of historical feature images;

determining a plurality of sample images relating to the plurality of historical service orders based on the second base image, the plurality of historical feature images, and the plurality of historical route channels; and determining the trained neural network model based on the plurality of sample images.

16. The method of claim 15, wherein the process for generating a trained neural network model further comprises:

obtaining signals including a plurality of actual times of arrival (ATAs) of the plurality of historical service orders;

obtaining signals including a preliminary neural network model;

determining a plurality of sample ETAs based on the preliminary neural network model and the plurality of sample images;

determining a loss function based on the plurality of ATAs and the plurality of sample ETAs;

determining whether a value of the loss function is less than a threshold;

designating the preliminary neural network model as the trained neural network model in response to the determination that the value of the loss function is less than the threshold; and updating the preliminary neural network model in response to the determination that the value of the loss function is larger than or equal to the threshold.

17. The method of claim 15, wherein determining the plurality of historical feature images relating to the plurality of historical service orders includes:

determining traffic information relating to the plurality of historical service orders; and determining the plurality of historical feature images based on the traffic information.

18. The method of claim 17, wherein the determining the plurality of historical feature images relating to the plurality of historical service orders includes:

normalizing the traffic information; and determining the plurality of historical feature images relating to the plurality of historical service orders based on the normalized traffic information.

19. The method of claim 15, wherein the determining a plurality of historical route channels relating to the plurality of historical service orders includes:

for each of the plurality of historical service orders,
determining a historical route relating to the each of the plurality of historical service orders on a historical feature image corresponding to the each of the plurality of historical service orders,
assigning a value for the historical route on the historical feature image, and
determining a historical route channel corresponding to the each of the plurality of historical service orders based on the value and the historical feature image.

20. A non-transitory computer-readable medium including executable instructions that, when executed by processing circuits, cause the medium to effectuate a method comprising:

obtaining signals including a service request from a terminal, wherein the service request is inputted by a user via the terminal;

determining a reference image relating to the service request, the reference image indicating geographic information, traffic information, and route information relating to the service request;

obtaining signals including a trained neural network model;

determining an ETA relating to the service request based on the reference image using the trained neural network model; and transmitting signals including the ETA to the terminal to make an interface of the terminal display the ETA.

* * * * *